United States Patent
Wang

(10) Patent No.: US 7,672,020 B2
(45) Date of Patent: Mar. 2, 2010

(54) MOIRE-BASED AUTO-STEREOSCOPIC ENHANCEMENT OF IMAGES FOR DUPLEX RENDERING ON TRANSPARENCIES

(75) Inventor: Shen-Ge Wang, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 1092 days.

(21) Appl. No.: 11/263,142

(22) Filed: Oct. 31, 2005

(65) Prior Publication Data

US 2007/0097441 A1 May 3, 2007

(51) Int. Cl.
*H04N 1/40* (2006.01)
(52) U.S. Cl. .................. 358/3.28; 358/3.3; 358/3.06
(58) Field of Classification Search ........... 359/376; 358/3.06; 428/156, 167, 187, 203, 212, 201, 428/329, 195.1, 318.4; 524/539; 156/85
See application file for complete search history.

(56) References Cited

U.S. PATENT DOCUMENTS

| | | | | |
|---|---|---|---|---|
| 5,734,752 A | * | 3/1998 | Knox | 358/3.28 |
| 5,790,703 A | * | 8/1998 | Wang | 358/3.28 |
| 5,946,103 A | * | 8/1999 | Curry | 358/3.28 |
| 6,103,345 A | * | 8/2000 | Oshima et al. | 428/172 |
| 6,252,971 B1 | * | 6/2001 | Wang | 382/100 |
| 6,296,281 B1 | * | 10/2001 | Stone | 283/93 |
| 6,317,226 B1 | * | 11/2001 | Yeh et al. | 359/2 |
| 6,329,040 B1 | * | 12/2001 | Oshima et al. | 428/156 |
| 6,575,564 B1 | * | 6/2003 | Tsuchiya et al. | 347/70 |
| 6,768,558 B1 | * | 7/2004 | Yamashita et al. | 358/1.18 |
| 7,286,682 B1 | * | 10/2007 | Sharma et al. | 382/100 |
| 7,352,879 B2 | * | 4/2008 | Wang | 382/100 |
| 7,580,155 B2 | * | 8/2009 | McElvain | 358/3.06 |
| 2003/0030271 A1 | * | 2/2003 | Wicker | 283/113 |

FOREIGN PATENT DOCUMENTS

| | | |
|---|---|---|
| CN | 1 583 415 A | 2/2005 |
| JP | 11 327065 A | 11/1999 |
| WO | WO 99 14725 | 3/1999 |

OTHER PUBLICATIONS

U.S. Appl. No. 11/263,190, filed Oct. 31, 2005, entitled "Moiré-Based Auto-Stereoscopic Images by Duplex Printing on Transparencies".
U.S. Appl. No. 11/263,368, filed Oct. 31, 2005, entitled "Moiré-Based Auto-Stereoscopic Watermarks".

* cited by examiner

*Primary Examiner*—Mark K Zimmerman
*Assistant Examiner*—Dung D Tran
(74) *Attorney, Agent, or Firm*—Philip E. Blair, Sr.; Fleit, Gibbons, Gutman, Bongini & Bianco P.L.

(57) ABSTRACT

Method for duplex printing on transparencies to create auto-stereoscopic enhancement to rendered images. On one side of the transparency is provided a uniform halftone with a selected median spatial frequency as printed. On the other side, the image for enhanced rendering consisting of two partitions is printed: that partition which is to be perceived as the background is printed using a halftone with spatial frequency equal to the median plus some delta x, while the other image partition is printed using a halftone with a spatial frequency equal to the median minus the same delta x. The spatial frequency difference creates a corresponding shift-magnification factor M with an amplified total depth of the shift-magnification factor M times the thickness of the transparency.

20 Claims, 8 Drawing Sheets

MOIRE-BASED AUTO-STEREOSCOPIC ENHANCEMENT OF IMAGES FOR DUPLEX RENDERING ON TRANSPARENCIES

CROSS-REFERENCE TO RELATED APPLICATIONS

Attention is directed to copending applications: U.S. application Ser. No. 11/263,190, entitled "MOIRÉ-BASED AUTO-STEREOSCOPIC IMAGES BY DUPLEX PRINTING ON TRANSPARENCIES"; and U.S. application Ser. No. 11/263,368, entitled "MOIRÉ-BASED AUTO-STEREOSCOPIC WATERMARKS". The disclosure found in each of these copending applications is hereby incorporated by reference in its entirety.

BACKGROUND AND SUMMARY

The teachings presented herein relate generally to stereoscopic images. More specifically the teachings presented herein relate to the creation of stereoscopic images by printing on transparencies.

The principle of stereoscopic vision is well understood. At the most basic level, each of the viewer's two eyes must perceive the subject matter to be viewed from a slightly different perspective. That is to say that, although the differences are generally quite subtle, each eye receives a different image.

Several methods are commonly used to produce stereoscopic images. On the one hand, these include the use of direction selective screens onto which two or more images may be projected simultaneously. Depending on the viewer's position, a different image may be observed by each eye. Where only two images are required, it is common practice to use polarizing techniques. Each image is projected with a characteristic polarization and when viewing through complementary polarizing viewing spectacles, each eye only sees the picture intended for its reception.

Most existing methods to view printed stereoscopic images require either special glasses (colored or polarized) or lenticular lenses. The stereogram may be the one exception which does not need any special viewing aid, however, many people find that it is very difficult and uncomfortable to see the hidden stereo image. Lenticular lenses are common but incur some additional expense and complexity as they require an embossed transparent material for operation.

What is needed is a method and apparatus for providing stereoscopic rendering of images with depth and impact yet are viewable without the need for lenticular or other special lenses and which may be readily and inexpensively provided with common materials using conventional printing apparatus.

Disclosed in embodiments herein is a moiré-based auto-stereoscopic enhanced rendered image comprising image data segmented into a first partition and a second partition for enhanced rendering. The rendered image includes a transparent substrate having a first side and a second side, with a first side applied marking material having a periodic structure at a first frequency, as applied to and placed on the first side of the transparent substrate. The rendered image also includes a second side applied marking material for rendering the image data as applied to the second side of the transparent substrate. The second side applied marking material further comprising for the image data first partition, a second periodic halftone structure at a second frequency, that second frequency being related to but some delta away from the first frequency, and for the image data second partition, a third periodic halftone structure at a third frequency, that third frequency being related to but some delta away from the first frequency, such that when the rendered transparent substrate is viewed from either side a moiré-based auto-stereoscopic enhanced rendered image is evident.

Further disclosed in embodiments herein is a method for providing an enhanced moiré-based auto-stereoscopic rendered image, by segmenting image data to be rendered into two partitions, as well as applying marking material with a halftone periodic structure at a first frequency to the first side of a transparent substrate. The method further comprises applying marking material within a first partition on the second side of the transparent substrate with a halftone periodic structure at a second frequency, that second frequency being related to but some delta away from the first frequency. The method also comprises applying marking material within a second partition on the second side of the transparent substrate with a halftone periodic structure at a third frequency, that third frequency being related to but some delta away from the first frequency such that a auto-stereoscopic moiré image is rendered.

Further disclosed in embodiments herein is a method for providing an enhanced moiré-based auto-stereoscopic rendered image, by segmenting image data to be rendered into two partitions, as well as applying marking material with a halftone periodic structure at a first frequency to the first side of a transparent substrate. The method further comprises applying marking material within a first partition on the second side of the transparent substrate with a halftone periodic structure at a second frequency, that second frequency being related to but some delta away from the first frequency. The method also comprises applying marking material within a second partition on the second side of the transparent substrate with a halftone periodic structure at the first frequency, such that a auto-stereoscopic moiré image is rendered.

DETAILED DESCRIPTION

A methodology is herein taught using duplex printing on transparencies to create auto-stereoscopic images viewed in a "see-through" manner. By choosing different halftone structures for each of the two sides of a transparency, a moiré pattern resulting due to halftone overlapping can be observed. When the transparency is viewed at different angles (as is inherent with the distance from the left eye to the right eye of an individual observer), a very small lateral shift occurs between the front-side and the back-side prints due to the thickness of the transparency and would not be otherwise normally noticeable. However, the corresponding resulting moiré shift can be much greater than the above-mentioned lateral shift and can also be in a different direction. As a result, the moiré result is apparently visually perceived as located in the space in front of or behind the transparency. For example, using an ordinary transparency with an approximately 100 micron thickness as is typical for laser printers, the appearance of perceived depth from the resulting moiré can be as large as hundred times the thickness of the transparency, or about 10 mm deep. The method provided herein teaches how to select halftone frequencies and estimate the resulting appearance of depth for the corresponding resulting moirés. A further example embodiment is taught below showing how stereoscopic moiré rendering of suitably segmented images with different depths are created. There are many possible applications for this method, such as in security printing, for advertising novelties, or in the enhancement of graphics content.

Figure 1:
FIG. 1 shows a line halftone with spatial frequency f1=16 LPI.
Figure 2:
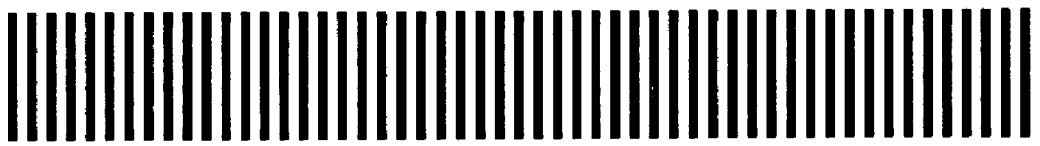
FIG. 2 shows line halftones with spatial frequencies f2=17 LPI.
Figure 3:
FIG. 3 shows an overlapping of the two line halftones f1 & f2 from FIGS. 1 & 2, one atop the other.

When two different halftones with similar spatial frequencies overlap each other, a moiré pattern may be observed. For example, FIGS. 1 and 2 are two line halftones with spatial frequencies f1=16 LPI (lines-per-inch) and f2=17 LPI, respectively. By overlapping the two halftones together, a moiré pattern, as shown in FIG. 3, can be observed. It is well known by those skilled in the art, that moiré frequency is equal to the difference or delta of the two line halftones, i.e., $\Delta f=f2-f1$. For the current example as provided in FIG. 3, $\Delta f=1$ LPI.

Figure 4:
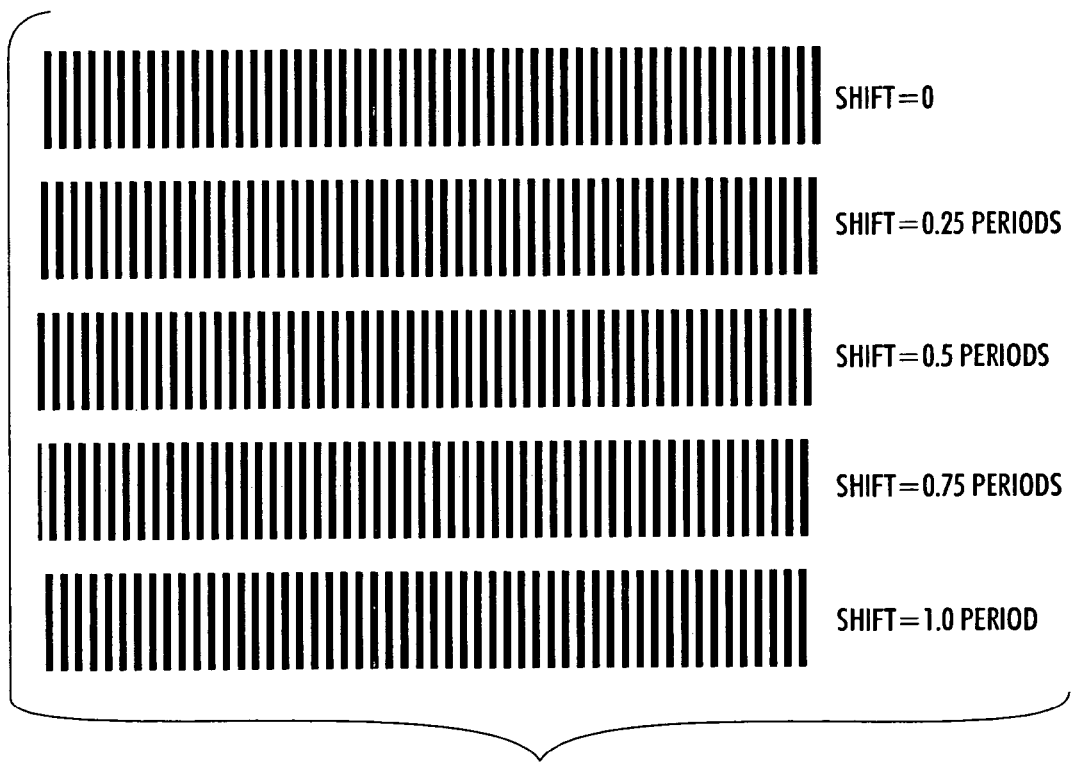
FIG. 4 shows the lateral shifting of the line halftone f2 from FIG. 2.

If one of the two line halftones is moved laterally with respect to another, the moiré also moves laterally but in different speed. To demonstrate the effect of a relative movement of two overlapped halftones, the line halftone f2 in FIG. 1 is shifted toward left in a step equal to a quarter of the period of the line halftone, or $0.25 \times 1/17$ inches. FIG. 4 shows the shift sequence of the line halftone f2 after four steps. The total lateral shift provided there is equal to $1/17$ inches.

Figure 5:
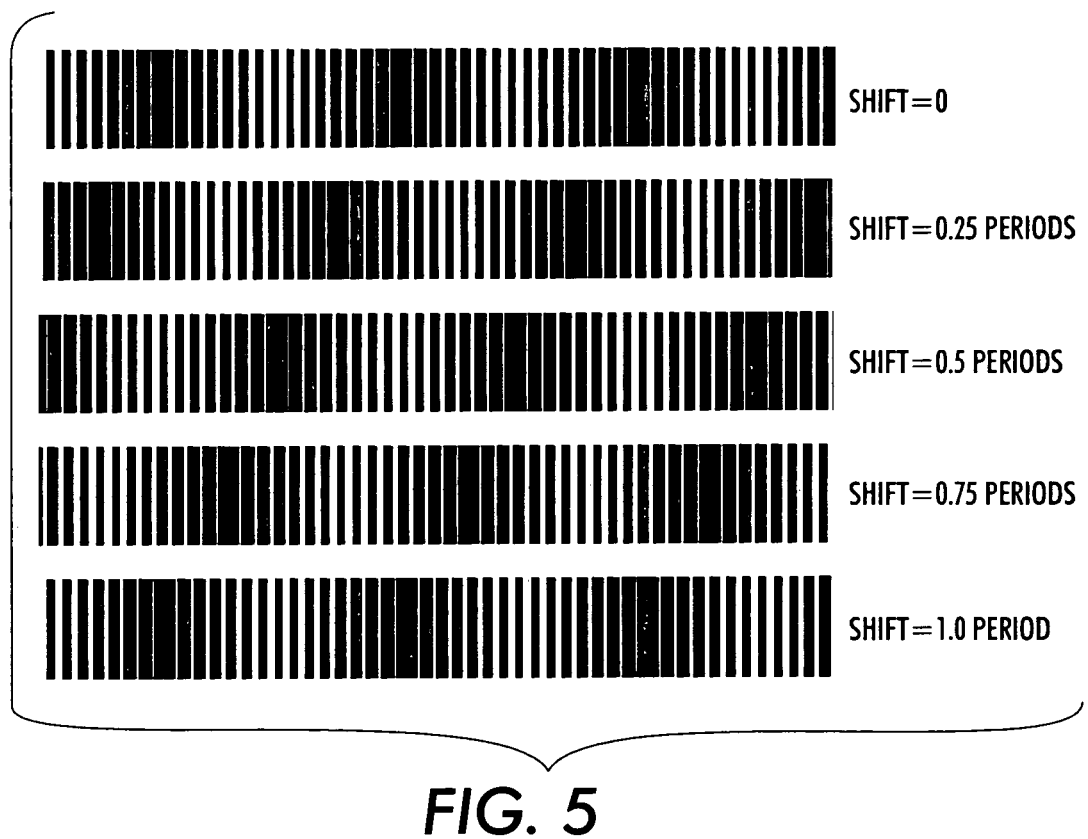
FIG. 5 shows the Moiré shift resultant from the overlap of f1 upon the lateral shift of f2 from FIG. 4.
Figure 6:
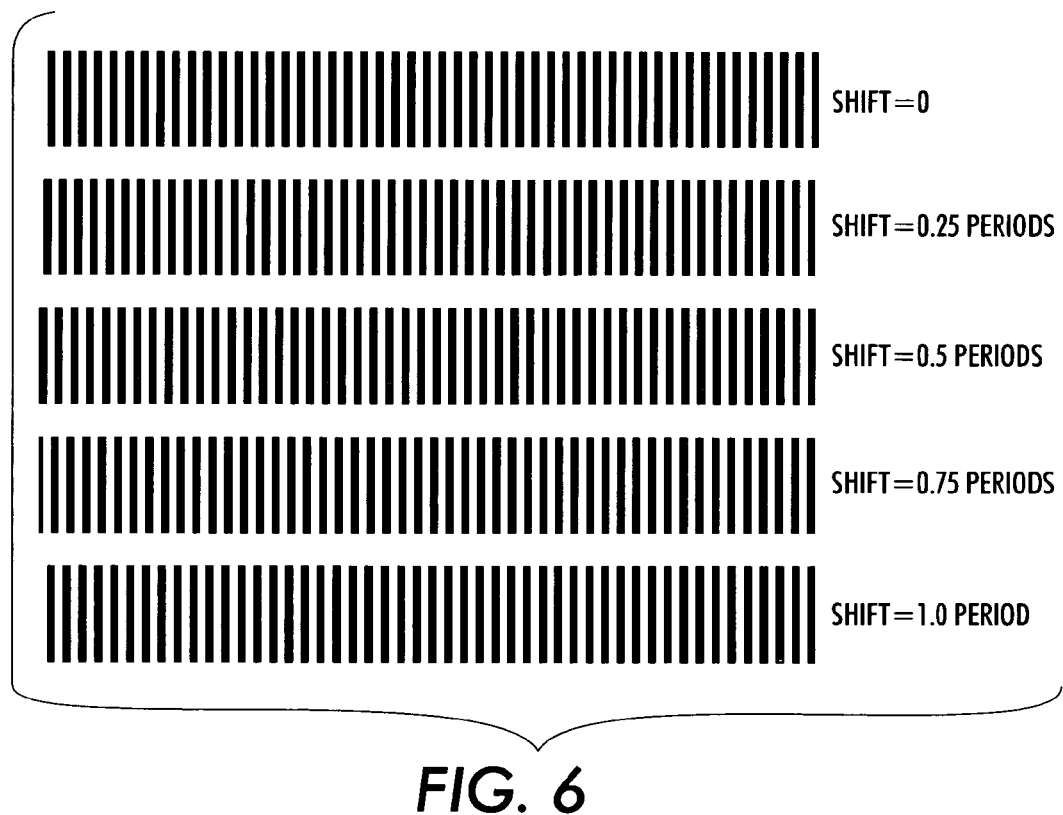
FIG. 6 shows the lateral shifting of the line halftone f1 from FIG. 1.
Figure 7:
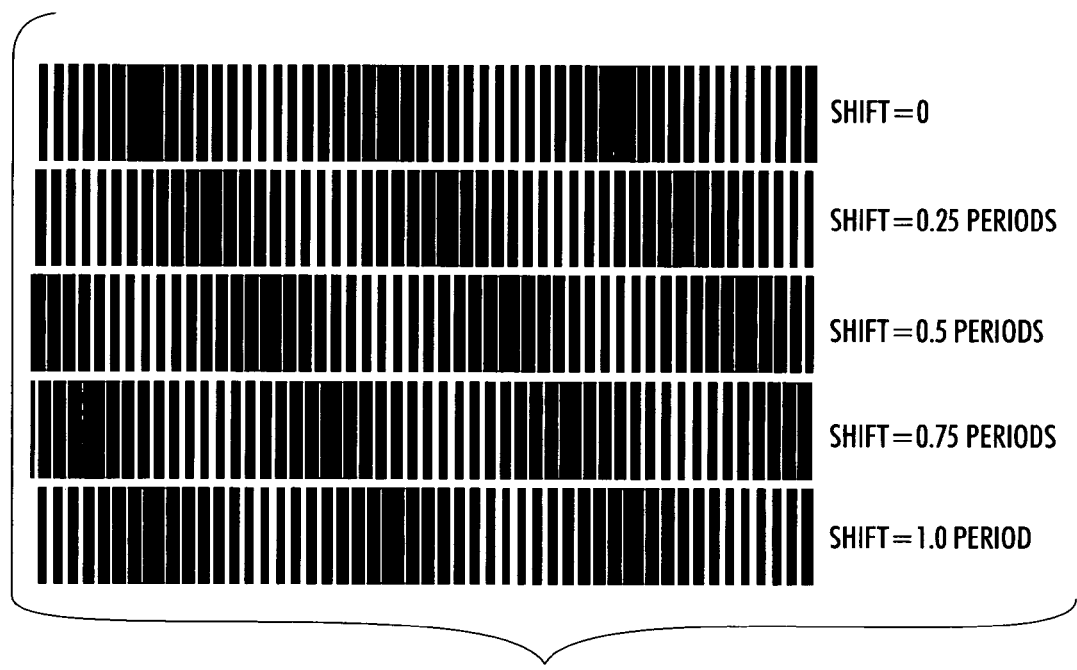
FIG. 7 shows the Moiré shift resultant from the overlap of f2 upon the lateral shift of f1 from FIG. 6.

By overlapping the shifted line halftone f2 to the halftone f1, one can see that the moiré is also shifted toward left in this case as depicted in FIG. 5 and the total lateral shift of the moiré after four steps is exactly equal to the period of the moiré, or one inch. It is also not difficult to see that the moiré moves in an opposite direction, if the lateral shift happens to the line halftone f1, when f2>f1. FIGS. 6 and 7 similarly demonstrate the result with a lateral shift of f1.

For the current analysis, we may assume that the moiré frequency is much, much less than the halftone special frequency or: $\Delta f \ll f$, where $f=(f1+f2)/2$ and $\Delta f=f2-f1$. Therefore, ignoring small differences in calculation, we may summarize the two cases of moiré shift in FIGS. 5 and 7 as follows: when the two overlapped halftone lines, f1 and f2, have a relative lateral shift, the moiré always moves in the direction defined by the movement of f2, the halftone with a higher spatial frequency. The moiré moves M times faster than the relative movement between f1 and f2, or M may be expressed as given by:

$$M=f/\Delta f, \text{ where } f=(f1+f2)/2 \text{ and } \Delta f=f2-f1. \quad (1)$$

Figure 8:
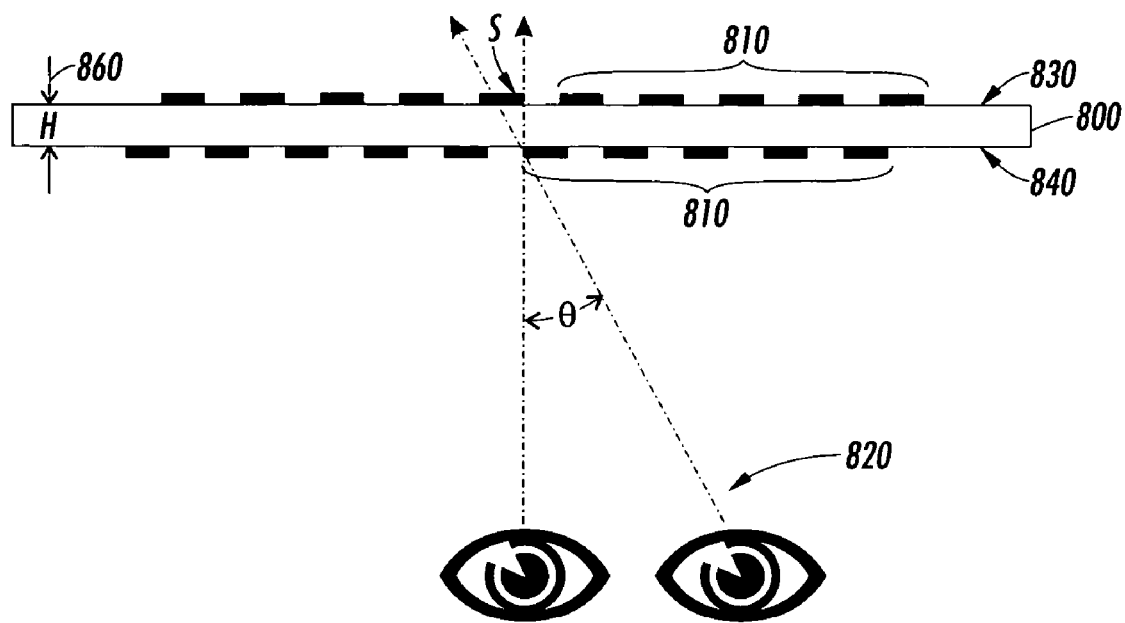
FIG. 8 shows as schematically depicted the eyes of an observer as viewing a transparency provided with duplex printing thereupon.

In FIG. 8 there is schematically depicted the eyes of an observer as viewing a transparency provided with duplex printing thereupon. When a transparent substrate 800 as provided with print 810 on both transparency sides 830 & 840 is viewed in a such "see-through" matter, each of the two individual eyes 820 of an observer are seeing slightly different overlapping images as provided by the two sides of the transparency 830 & 840. Due to the difference of viewing angles, θ, between each of the two eyes, and the finite thickness of the transparency 860, or "H", as compared to the image seen by the left eye, the right eye sees the print on the back side of the transparency with a small lateral shift, "S", with respect to the print on the front side. The shift "S" is approximately equal to: S=θH; and gives the appearance of shifting to the right in this example. Since a normal transparency 800 is only about 100-micron thick and θ, the difference of viewing angles by two eyes 820, is typically less than 0.5 degrees at a normal reading distance, the lateral shift "S" is too small to create any stereoscopic view for most such duplex prints.

However, if the two line halftones depicted in FIGS. 1 and 2 as provided with different spatial frequencies, f1 and f2, and are printed on two sides of a transparency respectively, a moiré will be observed clearly in a "see-through" viewing configuration. Because of the stereoscopic view of the two-sided print due to the thickness of the transparency, the resultant moiré seen by the two eyes 820 of the observer is different. If the line halftone with a higher spatial frequency f2 is printed on the back side 830 and the halftone with a lower frequency f1 is on the front side 840, the moiré is moving towards to the right when the viewing is changed from left to right. As described in above, the shift of the moiré is much greater than that due to "S" (lateral shift), the relative lateral shift of the two-side prints. Indeed, it is magnified by a factor M, as given by Equation 1 above: $M=f/\Delta f$, where $f=(f1+f2)/2$ and $\Delta f=f2-f1$. Therefore, the moiré appears as if it were printed on the back side of a much thicker transparency. In other words, the stereoscopic view of the overlapping of the two line halftones creates a stereo moiré image located in the space behind the transparency at a distance approximately M times the thickness of the transparency "H". If the same transparency is viewed with the line halftone f2 on the front side and f1 on the back side, the moiré will appears as located in the space in front of the transparency and also at a distance approximately equal to M×H. With current printing technologies it is not difficult to generate halftone line structures with a fairly large frequency range, so the magnification M can be easily varied between zero up to a hundred. Hence, by choosing right combinations of f1 and f2 for the duplex printing, it is possible to create moiré-based auto-stereoscopic images with a depth range in the order of a few millimeters.

In one example, a transparency shows a stereoscopic moiré image having two depth levels provided by using the technique described above. On one side of the transparency is provided a uniform line halftone with a spatial frequency of 120 LPI as printed. On the other side, the printing consists of two partitions: what is to be perceived as the background is printed using a line halftone with a 123 LPI spatial frequency, while a logo image partition is printed using a line halftone with a 117 LPI frequency. The spatial frequency difference between the line halftones on two sides is approximately equal to 3 LPI, thus, the corresponding shift-magnification factor M, as given by Equation 1 above, is about 40. Since the moiré produced by the two partition print images as visually located appear in two spatial planes as separated by the transparency, the total depth of this moiré image is about 80H, where "H" is the thickness of the transparency, and thus about 100 microns. Thus is yielded a moiré stereoscopic pattern clearly discernable to the human eye with out aid of lenses or other means.

The effective limitation to this magnification factor M, as given by Equation 1 above is constrained by two things. First is a given selected printer provides technology constraints as to the maximum print system frequency resolution, which at present is typically 300 LPI. This limits the upper moiré frequency limit. The second constraint is the human visual response to low frequency moiré as where low frequency beats (i.e. large Δf), if too low, will simply be right off the page.

Figure 9:
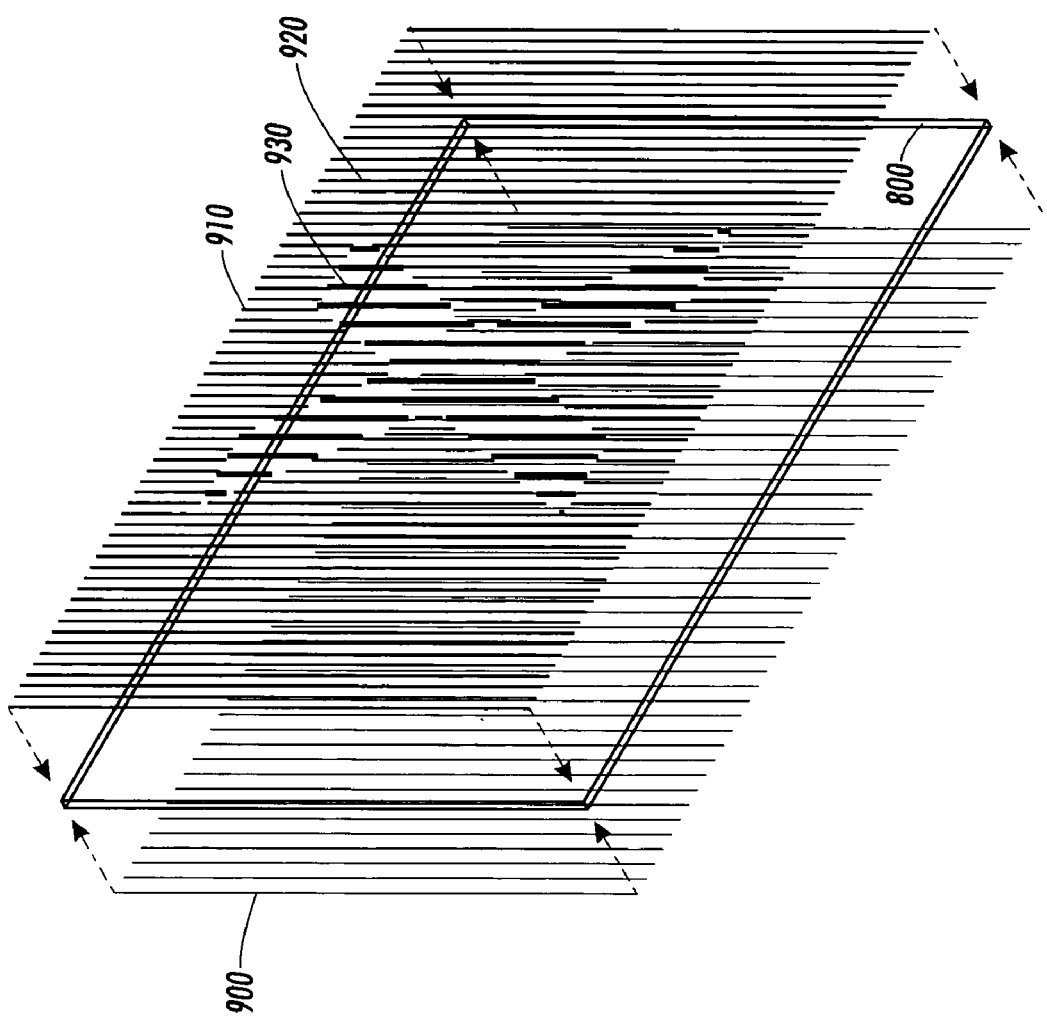
FIG. 9 shows an exploded view schematical depiction of one exemplary embodiment

FIG. 9 provides an exploded view, schematical depiction of one exemplary embodiment. Here transparent substrate 800 is provided with a front-side applied marking material of periodic structure 900, as well as, a back-side applied marking material of periodic structure 910. In this depiction, for the sake of explanation, the applied marking materials are shown as planes standing free of the substrate. However in at least one embodiment these applied marking materials of periodic structure are applied directly upon the transparent substrate's front and back sides, either by duplex printing or by way of conventional two pass printing. In another embodiment, one of the two applied planes of marking materials of periodic structure is alternatively applied to a second substrate instead of the transparent substrate 800 and that second substrate is then brought into close proximity and substantial alignment with the transparent substrate 800. Additional transparent substrates may also be placed between the transparent substrate 800 and the second substrate to effectuate a larger "H" and thus increase the perceived depth for an observer 820 as explained above.

On one side of the transparent substrate 800 the applied marking material of periodic structure 900 is provided by printing a uniform line halftone with a selected median spatial frequency. On the other side, for the applied marking material of periodic structure 910 there is provided by printing, two partitions: that which is to be perceived as the background partition 920 in this embodiment is printed using a line halftone with spatial frequency equal to the median plus some delta or difference in frequency amount (½Δf); while the desired image partition 930 is printed using a line halftone with a spatial frequency equal to the median minus the delta frequency amount. The spatial frequency difference between the line halftones on two sides creates a corresponding shift-magnification factor M. The moiré produced by the two print partitions 920 and 930 image as visually located in appearance in two separate spatial planes as separated by the transparency, with an effective amplified total depth as equal to the shift-magnification factor M times the thickness of the transparency. Thus is yielded a moiré stereoscopic pattern for the desired image partition 930 as clearly discernable to the human eye with out aid of lenses or other means.

Figure 10:
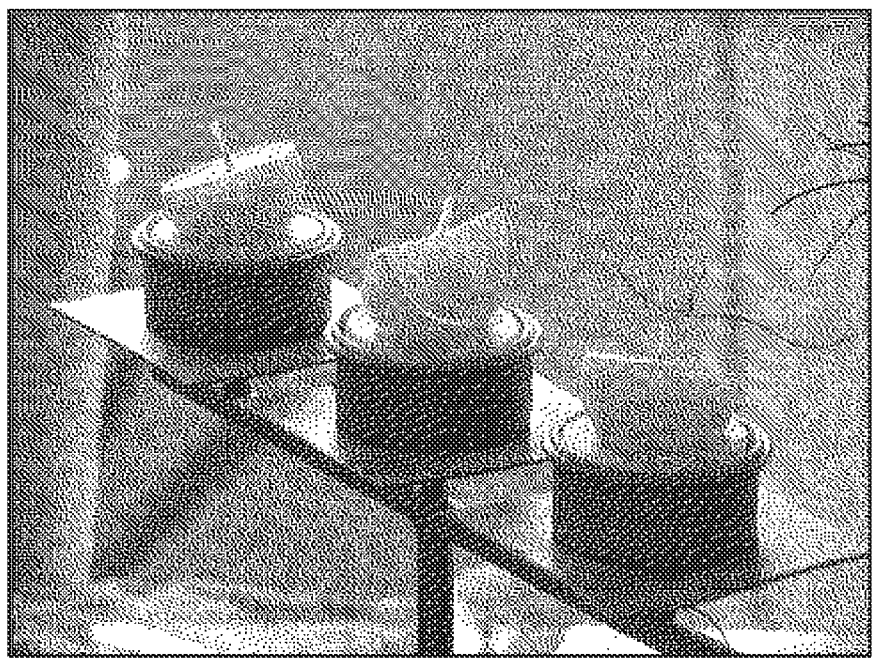
FIG. 10 depicts an example image data for application of the teachings provided herein.

Most printed two dimensional pictures are typically originally taken from three dimensional scenes. When these images are viewed by observers, a perception that three dimensional information is being witnessed may still be inferred by the observer from seeing shadows, aspect difference, blurring, or many other factors. However, as is well known there is no direct stereoscopic information shown in normal two dimensional prints. For example, the picture in FIG. 10 shows a stand with candles in front of a blurred background. By delineating the background as one segment receiving one spatial frequency, from the foreground image data receiving a second spatial frequency, when rendered the addition of auto-stereoscopic moiré provides desirable additional information and impact to the picture.

Figure 11:
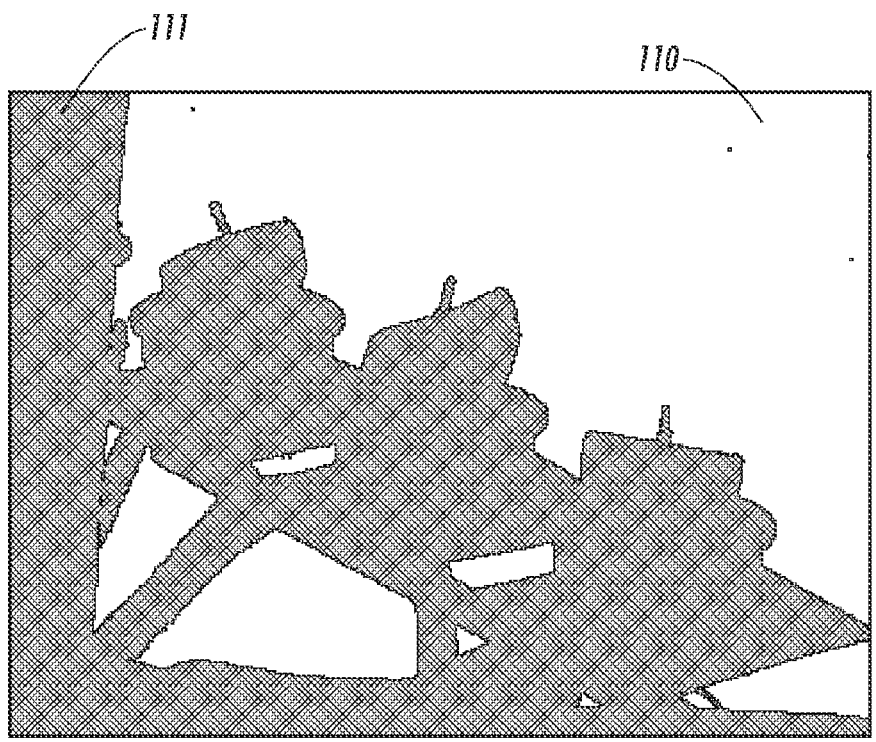
FIG. 11 depicts a flattened binary mask image of the image data provided in FIG. 10.

As is known to those skilled in the art there are many existing programs to extract foreground and background information from two dimensional images. One common example for illustration purposes, is the PhotoShop program. By the employ of such software it is possible to separate the background from the rest of the image in FIG. 10, to create a binary mask image as shown in FIG. 11. The white area 110 in FIG. 11 represents a background segment, while the black area 111 represents the segment for the grouped rest areas of the image.

The current example uses two line screens with different frequencies, f1 and f2, for the white 110 and the black segments 111 shown by FIG. 11, respectively. The input image, shown in FIG. 10, is halftoned by one of the two line screens at a time as based on the binary value of the mask image at the corresponding location. The halftone output is printed on one side of a transparency. Separately, a uniform halftone line structure with a halftone frequency f3 is printed on another side of the transparency. When the transparency is viewed in a "see-through" matter, stereoscopic moirés can be observed as described in previous sections. For the example shown here, f2=f3=120LPI, and f1=117 LPI was chosen. Thus, the noticeable moirés with a 3-LPI frequency delta due to the difference between f1 and f3 and are observed only in the background area specified by the white partition 110 of the mask image in FIG. 11. As proved previously, the moirés on the background segment appear clearly as located behind the paper surface, i.e., the surface of the rest of the image. As a result, the depth difference between the background and other parts of the image is viewed in a true stereoscopic matter.

Of course, different moirés may be applied to any number of additionally delineated segments determined as representing multiple selected depth levels, each in turn different from the other as well as from a background segment. Further, the stereoscopic appearance of the moiré may be rendered so as to be perceived as either behind or in front of the substrate surface as based on the appropriate choice of the frequency combination selected for the duplex printing as applied to a given segment. Even more complicated three dimensional outputs can be also achieved by using even more halftone screens and printing an appropriate mirror image of the input on the other side of the transparency in the correct alignment.

As will be evident to those skilled in the art, transparent substrate 800 may be plastic, glass, Plexiglas, etc. as well as the typical presentation transparency slide intended for usage by print systems as employed in combination with overhead projectors. Indeed transparent substrate 800 may be only partially transparent or translucent, though the effect will be impeded. As should be clear from the above teachings thicker substrates such as glass will yield a more pronounced effect. As will also be obvious to those skilled in the art, the applied marking materials 900 and 910, as discussed above may include liquid-based, toner-based, wax-based, inks or powders or solids, as well as paint or other pigment based materials.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A moire-based auto-stereoscopic enhanced rendered image, comprising:
    an image data set created by segmenting an image into a first partition and a second partition for enhanced rendering;
    a substantially transparent substrate having a first side surface and a second side surface opposite the first side surface;
    a first side applied marking material having a first halftone periodic structure at a first frequency, the first side applied marking material being applied to and placed on the first side surface of the substantially transparent substrate; and, a second side applied marking material comprising a rendering of the image data set, the second side applied marking material being applied to and placed on the second side surface of the substantially transparent substrate, the image data set first partition comprising a second periodic halftone structure at a fixed second frequency, that fixed second frequency being related to but some delta away from the first frequency, and the image data set second partition comprising a third periodic halftone structure at a fixed third frequency, that fixed third frequency being related to but some delta away from the first frequency, such that when the substantially transparent substrate having the first side applied marking material and the second side marking material applied is viewed from either side a moire-based auto-stereoscopic enhanced rendered image is evident.

2. The rendered image of claim 1 wherein the periodic structure is a line screen.

3. The rendered image of claim 1 wherein the substantially transparent substrate is a typical presentation transparency slide as intended for usage by print systems and employed in combination with overhead projectors.

4. The rendered image of claim 1 wherein the substantially transparent substrate is glass.

5. The rendered image of claim 1 wherein the substantially transparent substrate is Plexiglas.

6. The rendered image of claim 1 wherein the applied marking material is wax-based.

7. The rendered image of claim 1 wherein the applied marking material is paint.

8. The rendered image of claim 1 wherein the applied marking material is liquid-based.

9. The rendered image of claim 1 wherein the first frequency is 120 LPI, the second frequency is 123 LPI and the third frequency is 117 LPI.

10. A method for providing an enhanced moire-based auto-stereoscopic rendered image, comprising:

segmenting image data to be rendered into a first partition and a second partition;

applying marking material with a halftone periodic structure at a first frequency to a first side of a substantially transparent substrate;

applying marking material comprising the first partition on a second side of the substantially transparent substrate with a halftone periodic structure at a fixed second frequency, that fixed second frequency being related to but some delta away from the first frequency, the second side being opposite the first side; and, applying marking material comprising the second partition on the second side of the substantially transparent substrate with a halftone periodic structure at a fixed third frequency, that fixed third frequency being related to but some delta away from the first frequency such that a auto-stereoscopic moire image is rendered.

11. The rendered image of claim 10 wherein the halftone periodic structure is a line screen.

12. The rendered image of claim 10 wherein the substantially transparent substrate is a typical presentation transparency slide as intended for usage by print systems and employed in combination with overhead projectors.

13. The rendered image of claim 10 wherein the substantially transparent substrate is glass.

14. The rendered image of claim 10 wherein the substantially transparent substrate is plastic.

15. The rendered image of claim 10 wherein the substantially transparent substrate is Plexiglas.

16. The rendered image of claim 10 wherein the substantially transparent substrate is translucent.

17. A method for providing an enhanced moire-based auto-stereoscopic rendered image, comprising:

segmenting image data to be rendered into a first partition and a second partition;

applying marking material with a halftone periodic structure at a first frequency to a first side of a substantially transparent substrate;

applying marking material comprising the first partition on a second side of the substantially transparent substrate with a halftone periodic structure at a fixed second frequency, that fixed second frequency being related to but some delta away from the first frequency; and, applying marking material comprising the second partition on the second side of the substantially transparent substrate with a halftone periodic structure at the first frequency, such that a auto-stereoscopic moire image is rendered.

18. The rendered image of claim 1, wherein the second side applied marking material is applied to a single layer of the substantially transparent substrate.

19. The rendered image of claim 1, wherein the second side applied marking material is applied to and placed on the second side surface by printing onto the second side surface.

20. The rendered image of claim 1, wherein the image data set is created by segmenting the image, wherein the image comprises a two dimensional image and the segmenting the image comprises extracting foreground and background information from the two-dimension image.

* * * * *